(12) United States Patent
Damera-Venkata

(10) Patent No.: US 9,218,323 B2
(45) Date of Patent: Dec. 22, 2015

(54) OPTIMIZING HYPER PARAMETERS OF PROBABILISTIC MODEL FOR MIXED TEXT-AND-GRAPHICS LAYOUT TEMPLATE

(75) Inventor: Niranjan Damera-Venkata, Mountain view, CA (US)

(73) Assignee: Hewlett-Parkard Development Company, L.P., Houston, TX (US)

( * ) Notice: Subject to any disclaimer, the term of this patent is extended or adjusted under 35 U.S.C. 154(b) by 270 days.

(21) Appl. No.: 13/817,689

(22) PCT Filed: Oct. 30, 2010

(86) PCT No.: PCT/US2010/054894
§ 371 (c)(1),
(2), (4) Date: Feb. 19, 2013

(87) PCT Pub. No.: WO2012/057804
PCT Pub. Date: May 3, 2012

(65) Prior Publication Data
US 2013/0212471 A1    Aug. 15, 2013

(51) Int. Cl.
G06F 17/21    (2006.01)
G06F 17/22    (2006.01)
G06F 17/24    (2006.01)

(52) U.S. Cl.
CPC ............ *G06F 17/212* (2013.01); *G06F 17/211* (2013.01); *G06F 17/2282* (2013.01); *G06F 17/248* (2013.01)

(58) Field of Classification Search
CPC ............ G06F 17/2235; G06F 17/2247; G06F 17/212; G06F 17/30864; G06F 17/24; G06F 17/211; G06F 17/2282; G06F 17/248
USPC .......................... 715/243, 201, 205, 252, 244
See application file for complete search history.

(56) References Cited

U.S. PATENT DOCUMENTS

| | | | |
|---|---|---|---|
| 6,173,286 B1 * | 1/2001 | Guttman et al. | 715/234 |
| 7,203,902 B2 * | 4/2007 | Balinsky | 715/243 |
| 7,788,579 B2 * | 8/2010 | Berkner et al. | 715/243 |
| 8,429,517 B1 * | 4/2013 | Damera-Venkata et al. | 715/205 |
| 8,612,849 B2 * | 12/2013 | Boreham et al. | 715/243 |
| 2002/0122067 A1 * | 9/2002 | Geigel et al. | 345/788 |
| 2004/0019850 A1 * | 1/2004 | Purvis et al. | 715/517 |
| 2004/0024613 A1 * | 2/2004 | Harnngton et al. | 705/2 |
| 2004/0255245 A1 * | 12/2004 | Yamada et al. | 715/517 |
| 2005/0055635 A1 * | 3/2005 | Bargeron et al. | 715/525 |
| 2005/0223319 A1 * | 10/2005 | Ohashi et al. | 715/517 |
| 2006/0193008 A1 * | 8/2006 | Osaka et al. | 358/1.18 |
| 2006/0200758 A1 * | 9/2006 | Atkins | 715/517 |
| 2006/0200759 A1 * | 9/2006 | Agrawala et al. | 715/517 |
| 2006/0271903 A1 * | 11/2006 | Hamazaki | 716/17 |
| 2006/0279566 A1 * | 12/2006 | Atkins et al. | 345/418 |
| 2007/0038643 A1 * | 2/2007 | Epstein | 707/10 |

(Continued)

OTHER PUBLICATIONS

Grangier, David et al, "Learning the Inter-frame Distance for Discriminative Template-based Keyword Detection" 2007.

(Continued)

*Primary Examiner* — Scott Baderman
*Assistant Examiner* — Hassan Mrabi
(74) *Attorney, Agent, or Firm* — Michael A. Dryja

(57) ABSTRACT

Example pages in which text and graphics have been laid out using a mixed text-and-graphics layout template are received from a user. Hyper parameters of a probabilistic model for the mixed text-and-graphics layout template are optimized, based on the example pages.

17 Claims, 6 Drawing Sheets

(56) References Cited

U.S. PATENT DOCUMENTS

| | | | |
|---|---|---|---|
| 2007/0079236 A1* | 4/2007 | Schrier et al. | 715/517 |
| 2007/0113175 A1* | 5/2007 | Iwasaki | 715/517 |
| 2007/0285500 A1* | 12/2007 | Ma et al. | 348/14.07 |
| 2008/0215965 A1* | 9/2008 | Abrams et al. | 715/246 |
| 2008/0256439 A1* | 10/2008 | Boreham et al. | 715/246 |
| 2009/0013246 A1 | 1/2009 | Cudich et al. | |
| 2009/0028443 A1* | 1/2009 | Chen et al. | 382/224 |
| 2009/0180538 A1* | 7/2009 | Visharam et al. | 375/240.15 |
| 2010/0329550 A1* | 12/2010 | Cheatle | 382/165 |
| 2010/0329588 A1* | 12/2010 | Cheatle | 382/298 |
| 2011/0065082 A1* | 3/2011 | Gal et al. | 434/365 |
| 2011/0197126 A1* | 8/2011 | Arastafar | 715/243 |
| 2012/0030033 A1* | 2/2012 | Damera-Venkata | 705/14.71 |
| 2012/0159314 A1* | 6/2012 | Schrier et al. | 715/252 |
| 2012/0204098 A1* | 8/2012 | Venkata | G06F 17/21 715/243 |
| 2013/0014008 A1* | 1/2013 | Damera-Venkata | 715/252 |
| 2013/0185632 A1* | 7/2013 | Damera-Venkata | G06F 17/248 715/243 |
| 2013/0205199 A1* | 8/2013 | Damera-Venkata | G06F 17/212 715/243 |

OTHER PUBLICATIONS

Peng Wang et al, "A Probabilistic Template-besed Approach to Discovering Repetitive Patterns in Broadoase Videos" 2005.

* cited by examiner ated with the images 106, and the images 106 are provided in a particular order 110 corre-

OPTIMIZING HYPER PARAMETERS OF PROBABILISTIC MODEL FOR MIXED TEXT-AND-GRAPHICS LAYOUT TEMPLATE

BACKGROUND

Mixed-content page layout is the process of laying out different types of content on a printed or an electronically displayed page in an aesthetically pleasing manner. The types of content can include text as well as images. Traditionally, the mixed-content page layout process has been performed manually. For example, publishers of magazines and newspapers usually employ graphic designers that determine the best way in which lay out text and images on pages in an aesthetically pleasing manner, while at the same time adhering to general layout guidelines for their particular magazines or newspapers. As another example, more amateur users may select a predesigned template to lay out their mixed content on pages as diverse as blogs, newsletters, and so on.

DETAILED DESCRIPTION

Figure 1:
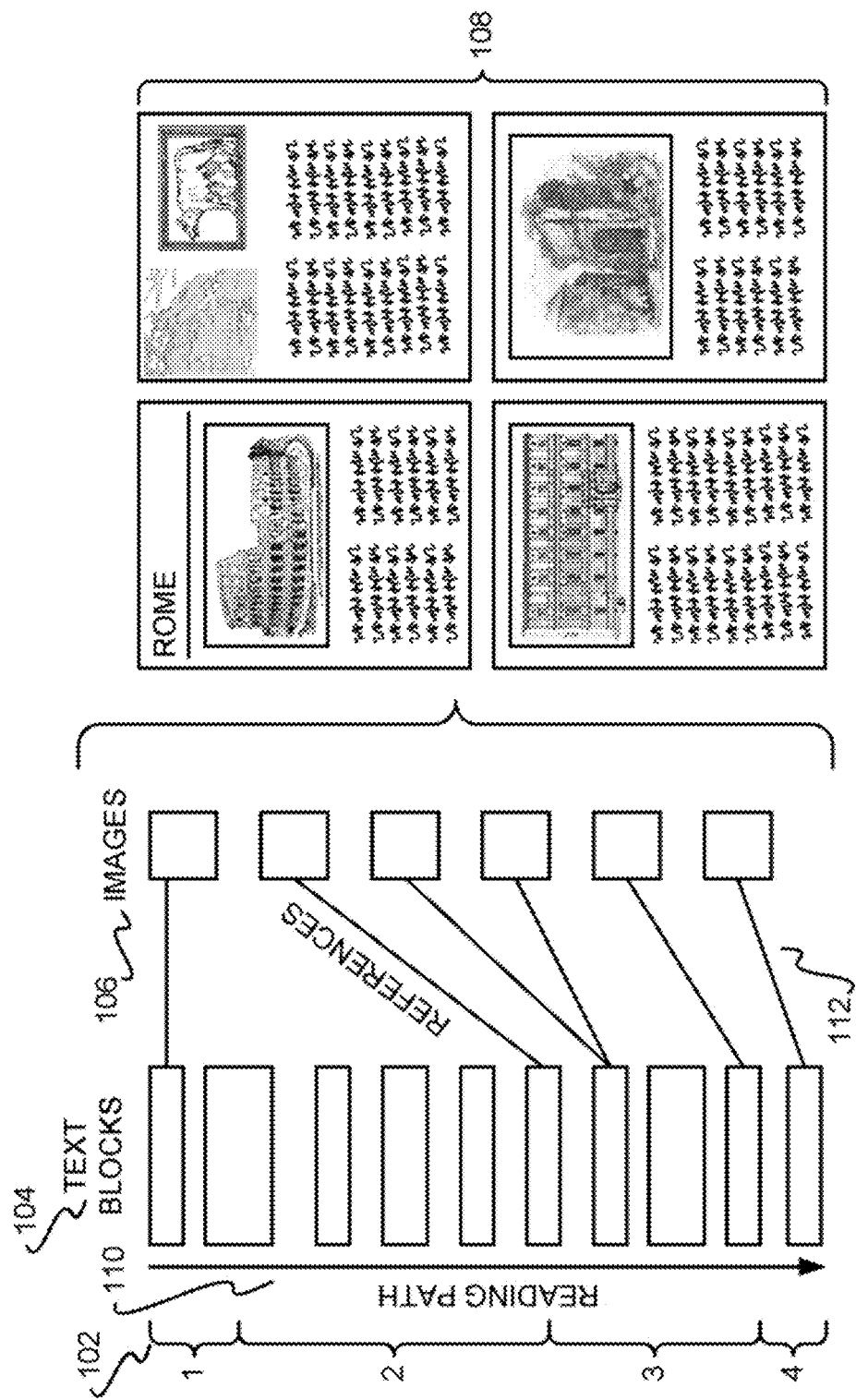
FIG. 1 is a diagram of a representative example of how a probabilistic mixed text-and-graphics layout model generally works, according to an example of the disclosure.

As noted in the background section, mixed-content page layout is the process of laying out different types of content on a printed or an electronically displayed page in an aesthetically pleasing manner. Whereas traditionally the mixed-content page layout process has been performed manually, more recently automated approaches have been developed for achieving mixed-content page layout. For example, such automated approaches include probabilistic mixed-content (i.e., mixed text-and-graphics) page layout models. Such probabilistic models can receive as input blocks of text and images, as well as a number of generalized predesigned templates. A probabilistic model selects which template to use for each page, modifies the template as appropriate, and automatically populates the template with the input content without user interaction.

When using such a probabilistic model, a graphics designer generally is initially employed to specify distributions of parameters of the probabilistic model for a given mixed text-and-graphics layout template. Such parameter constraints can include, for instance, how much the height and width of an image field of the layout template can be scaled, and how much the amount of white, space between an image field and a text field of the template can be varied. The Image field is a field of the layout template in which an image is to be placed, whereas a text field is a field of the template in which text is to be placed. Other parameters can include the left, right, top, and bottom margins of the layout template. By the graphic designer specifying, for instance, the distribution of each parameter his or her knowledge is internalized within the probabilistic model for the layout template in question.

Besides the expense and time associated with employing a graphics designer to specify these parameter distributions, another disadvantage with this approach is that the graphics designer is unlikely to be able to specify how the parameters are interrelated. For example, a graphics designer may inherently know that if the height and width of an image field are varied by a certain amount, then the white space between this image field and the text field should be varied by a related amount. What are referred to as the hyper parameters of the probabilistic model can include such interrelatedness, where this interrelatedness can more specifically be described as a number of distributions of the parameters of the model, as well as variances (including covariances) of these parameters.

Because it can be difficult at best to train a graphics designer so that he or she can adequately express these hyper parameters, the probabilistic model may instead make simplistic assumptions about them that do not accurately reflect the graphics designer's knowledge. As such, the ability of the probabilistic model to modify an associated page layout template to generate a page layout for input text and graphics, and to select which page layout of a number of different generated page layouts to actually use for the text and graphics, is hampered. Even if a graphics designer can be trained to adequately specify the hyper parameters, it can be costly and time-consuming to do so.

By comparison, the present disclosure presents techniques for optimizing the hyper parameters of a probabilistic model for a mixed text-and-graphics layout model without user interaction. Rather than requesting that a graphics designer specify the hyper parameters of the probabilistic model, the graphics designer instead is requested to generate example pages in which text and graphics have been laid out using a mixed text-and-graphics layout template. The graphics designer generates the example pages by modifying the parameters of the model in a way that is pleasing to him or her, based on the graphic designer's intrinsic knowledge. The graphics designer thus is simply doing his or her job, and is not being asked to do something that the designer may have difficulty in doing, such as actually specifying the hyper parameters of the probabilistic model.

The hyper parameters of the probabilistic model for the mixed text-and-graphics layout model are then optimized without user interaction, based on the example pages that have been received from the graphics designer. For example, an expectation-maximization approach can be used to optimize the hyper parameters of the model. The hyper parameters are optimized without user interaction even though a user like a graphics designer generates the example pages, in that the optimization process itself is performed without any interaction from a user. For instance, the graphics designer is not asked to specify the hyper parameters. Using the disclosed techniques, a resulting probabilistic model for a mixed text-and-graphics layout template can be generated more quickly and with less expense, and the resulting model is more likely to be able to generate pleasing page layouts for input text and graphics than a model for which a user has had to specify the hyper parameters.

FIG. 1 shows a representative example of how a probabilistic mixed text-and-graphics layout model generally works, according to an example of the disclosure. Mixed content including text blocks 104 and images 106, such as figures, are to be laid out on pages 108. Each image 106 corresponds to a particular text block 104, as indicated by references 112. The text blocks 104 are provided in a particular order 110 corresponding to the reading path in which the blocks 104 should be presented to the user on the pages 108. Each image 106 is to be placed as close to its corresponding text block 104, and desirably after the text block 104 is presented on a page 108, as well as desirably on the same page 108 as the text block 104.

A probabilistic mixed text-and-graphics layout model thus processes the text blocks 104 starting at the first text block 104, and lays out successive pages 108 that include the text blocks 104 and their associated images 106. For each page, the model selects which of a number of generalized predesigned templates to use in a probabilistic manner, based on the text blocks 104 and their associated images 106, and adjusts and then populates the selected template with some of the text blocks 104 and the images 106. Reference number 102 thus points to which text blocks 104 and which images 106 are located on which pages 108.

A page is considered a printed page or an electronically displayed page. A printed page has a size no greater than the size of a medium sheet, such as paper, on which the page is printed. In this case, the images 106 are static images. By comparison, an electronically displayed page has a size no greater than the size of the display on which the page is displayed, so that each page does not extend over multiple sheets. As such, a page is completely displayable on the display, and scrolling is unnecessary to view the page completely on the display. Furthermore, in this case the images 106 can include both static images as well as moving images—i.e., video that may or may not include audio.

Figure 2:
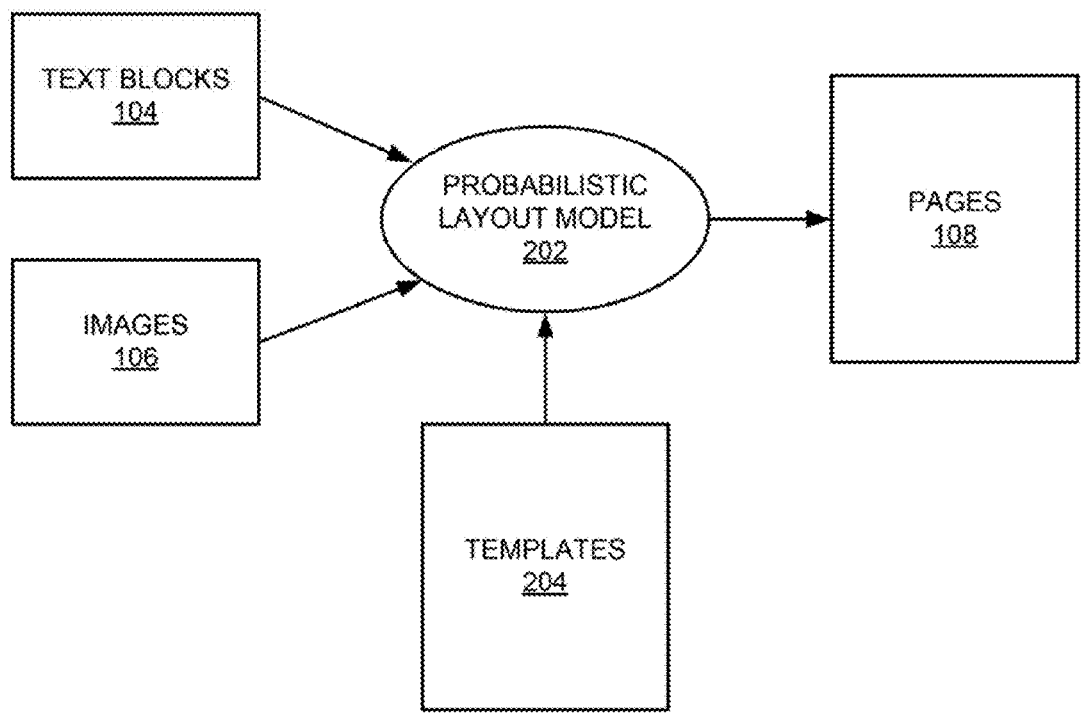
FIG. 2 is a diagram of the input and output of a probabilistic mixed text-and-graphics layout model, according to an example of the disclosure.

FIG. 2 shows the input and output of a probabilistic mixed text-and-graphics layout model 202, according to an example of the disclosure. The probabilistic model 202 receives as input a number of generalized predesigned templates 204 that can be modified as appropriated by the model 202. The templates 204 are typically provided to the model 202 before the model 202 is actually used to generate pages on which mixed content has been laid out.

The probabilistic mixed text-and-graphics layout model 202 also receives as input one or more text blocks 104 and one or more images 106. The text blocks 104 are provided in a given order corresponding to a reading path in which the blocks 104 should be presented on the pages 108. The images 106 are each associated with a text block 104. Once the generalized predesigned templates 204 have been input into the probabilistic model 202, and after the text blocks 104 and the images 106 have been input as well, the model 202 generates the pages 108 with the text blocks 104 and the images 106 laid out on them without any user interaction.

The probabilistic mixed text-and-graphics layout model 202 that is employed by examples of the disclosure can be the probabilistic mixed-content page layout model that is described in two presently pending patent applications. The first patent application is the PCT patent application entitled "probabilistic methods and systems for preparing mixed-content document layouts," filed on Oct. 20, 2009, and assigned patent application number PCT/US2009/061320. The second application is the PCT patent application entitled "methods and systems for preparing mixed-content documents," filed on Oct. 28, 2009, and assigned patent application number PCT/US2009/062288.

In general, the probabilistic mixed text-and-graphics layout model 202 is a page layout model in that it lays out content on pages 108. The model 202 is a mixed-content model in that the content laid out on the pages 108 is mixed content including at least text blocks 104 and images 106. The model 202 is a probabilistic model in that it uses probabilistic methods in determining which text blocks 104 and which images 106 (as well as which contextual advertisements) are displayed on each page 108, and in determining how these mixed types of content are displayed on each page 108.

The model 202 is further a probabilistic model in that it is a priori non-deterministic. That is, the generalized predesigned templates 204 are probabilistic page layout templates. The templates 204 do not absolutely specify where a given type of content is to be placed on a page 108. Rather, the templates 204 are more generalized, and indicate in effect general guidelines as to how various types of content should be placed on a page 108. The probabilistic aspect of a page layout template 204 results from manipulation of the general guidelines in content placement resulting in a greater or a lesser probability as to how aesthetically pleasing a result page layout using the template 204 as a guide is likely to be.

For example, depending on one or more particular text blocks 104 and one or more particular images 106 to be placed on a given page 108, a given page layout template 204 may provide general guidelines as to how much the images 106 can be resized, and how much the distance between the text blocks 104 and the images 106 can be adjusted. The probabilistic mixed text-and-graphics layout model 202 then adjusts these parameters based on the actual text blocks 104 and images 106 to be placed on the page 108. The resulting laid-out page 108 may then have a probabilistic score corresponding to how aesthetically pleasing the page 108 is.

This process is selectively repeated for each page 108 using a variety of different (or the same) templates 204. Ultimately, the probabilistic mixed text-and-graphics layout model may select page layout template(s) 204 for the pages 108 that result in the highest overall probabilistic score for the pages 108 as a group. Therefore; for a given page 108, the probabilistic score for the ultimately selected template 204 may be less than the probabilistic score if a different template 204 were selected. However, if the total probabilistic score of all the pages 108 is nevertheless higher, then the latter template 204 may not be selected for the given page 108.

It is noted that the probabilistic mixed text-and-graphics layout model 202 can be considered as being for each layout template 204, insofar as the layout templates 204 include parameters that can be adjusted by the probabilistic model 202. Stated another way, for a given layout template 204, the probabilistic mixed text-and-graphics layout model 202 is a probabilistic model for the layout template 204. As such, the parameters and hyper parameters of the layout template 204 can be considered as the parameters and hyper parameters of the probabilistic model 202 itself, in relation to this layout template 204. Therefore, optimizing the hyper parameters, for instance, of the layout template 204 is considered herein as equivalent to optimizing the hyper parameters of the probabilistic model 202 itself.

Figure 3:
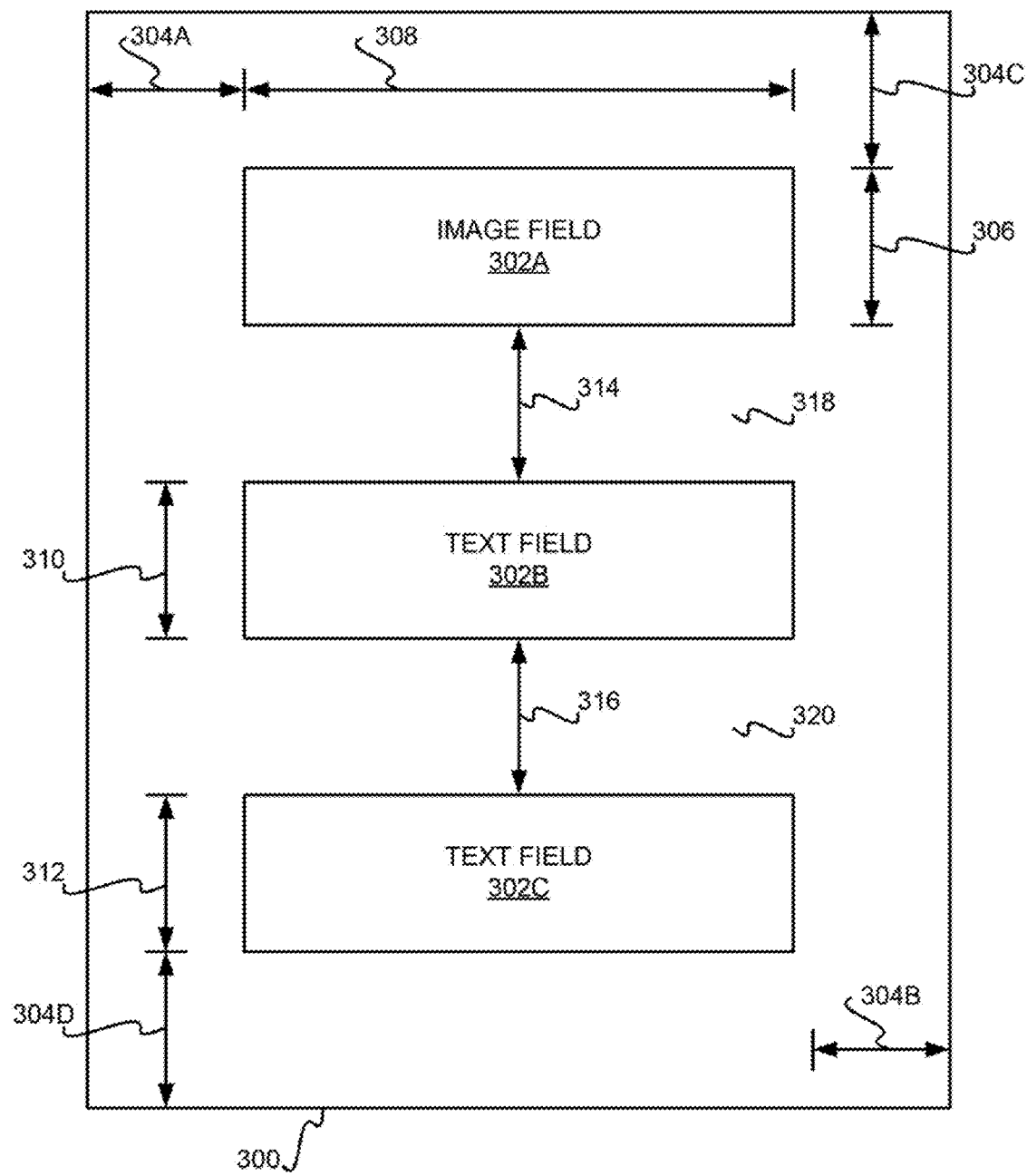
FIG. 3 is a diagram of a representative page layout template, according to an example of the disclosure.

FIG. 3 shows a representative layout template 300, according to an example of the disclosure. The layout template 300 is representative of the templates 204 that have been described. The layout template 300 includes an image field 302A, a text field 302B, and a text field 302C, all of which are collectively referred to as the fields 302. The parameters of the layout template 300 include a right margin 304A, a left margin 304B, a top margin 304C, and a bottom margin 304D, all of which are collectively referred to as the fields 304.

The width 308 of the fields 302 is defined by a constant multiplied by a parameter, where the parameter can be adjusted by the probabilistic mixed text-and-graphics layout model 202. The height 306 of the image field 306 is also defined by a constant multiplied by a parameter, where the parameter can be adjusted by the probabilistic model 202. By comparison, the heights 310 and 312 of the text fields 302B and 302C may be specified based on the text being input, and thus cannot be adjusted by the probabilistic model 202. However, the height 314 of the white space 318 between the image field 302A and the text field 302B, and the height 316 of the white space 320 between the text fields 302B and 302C, are defined by parameters that can be adjusted by the probabilistic model 202.

Figure 4:
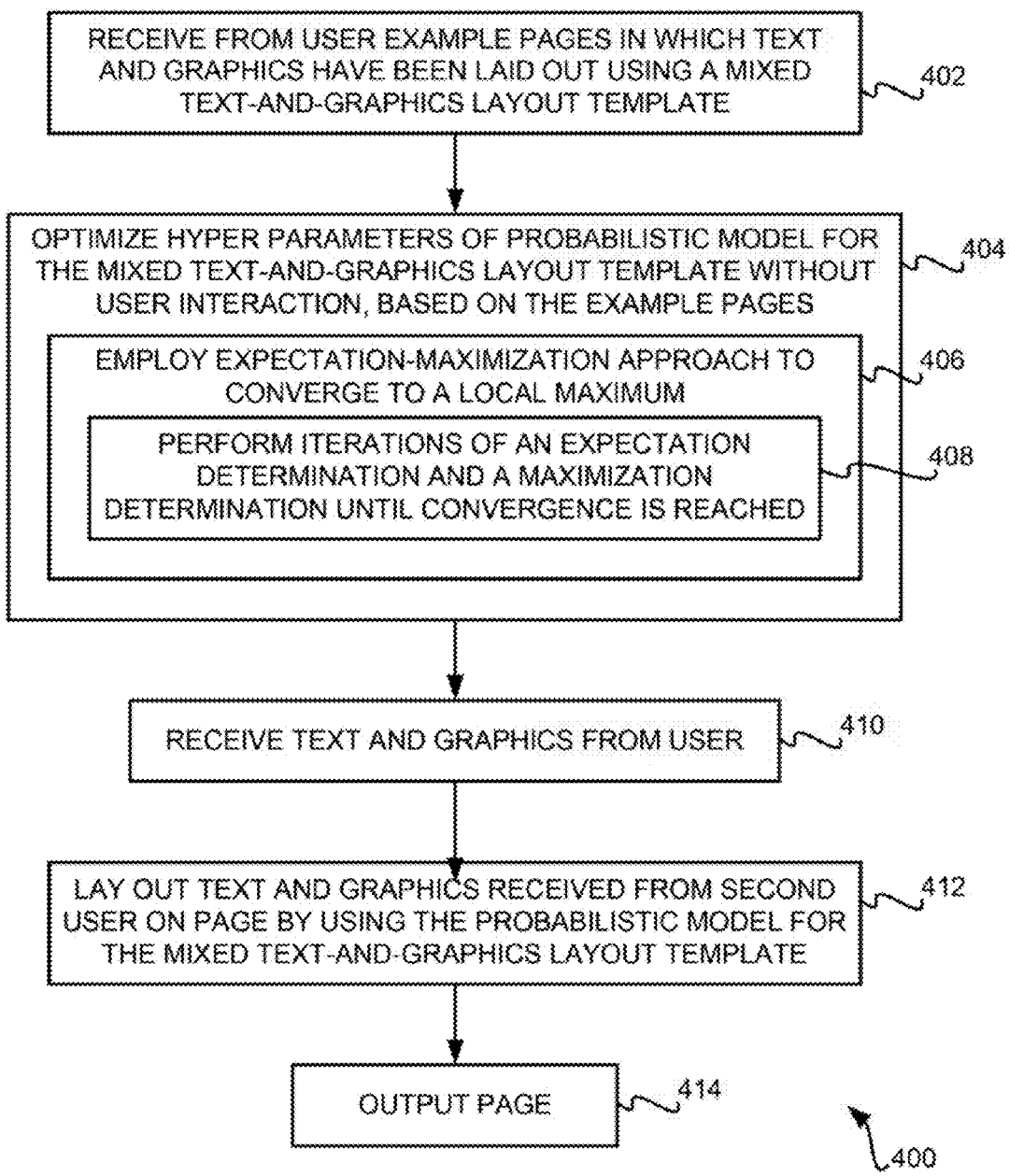
FIG. 4 is a flowchart of a method, according to an example of the disclosure.

FIG. 4 shows a method 400 for optimizing the hyper parameters of the probabilistic mixed text-and-graphics layout model 202 for the layout template 300, and for then using the probabilistic model 202 for the template 300, according to an example of the disclosure. The method 400 may be performed by a computer program executed by a processor of a computing device. The computer program may be stored on a non-transitory computer-readable data storage medium. Examples of such computer-readable data storage media include volatile and non-volatile storage media, such as magnetic media like hard disk drives, and semiconductor media like semiconductor memory and flash drives.

The method 400 receives from a user example pages in which text and graphics have been laid out using the layout template 300 (402). For instance, the user may be a graphics designer, who has provided multiple examples of pages in which text and graphics have been laid out within the layout template 300 in a pleasing manner. The user thus does not have to specify the constraints of the parameters of the layout template 300, nor the hyper parameters, but rather modifies the layout template 300 by specifying the parameters to generate pages that are pleasing.

For instance, as to the layout template 300, the user can modify the parameters that dictate the height 306 and the width 308 of the image field 308, as well as the parameters 318 and 320 that control the amount of white space 314 and 316. The user can further modify the margins 304. However, what the user does not specify is how these parameters are related to one another, nor how the parameters should be maximally and minimally constrained. Rather, in the case where the user is a graphics designer, the user simply generates pages no differently than he or she would while performing his or her job as a graphics designer.

Figure 5:
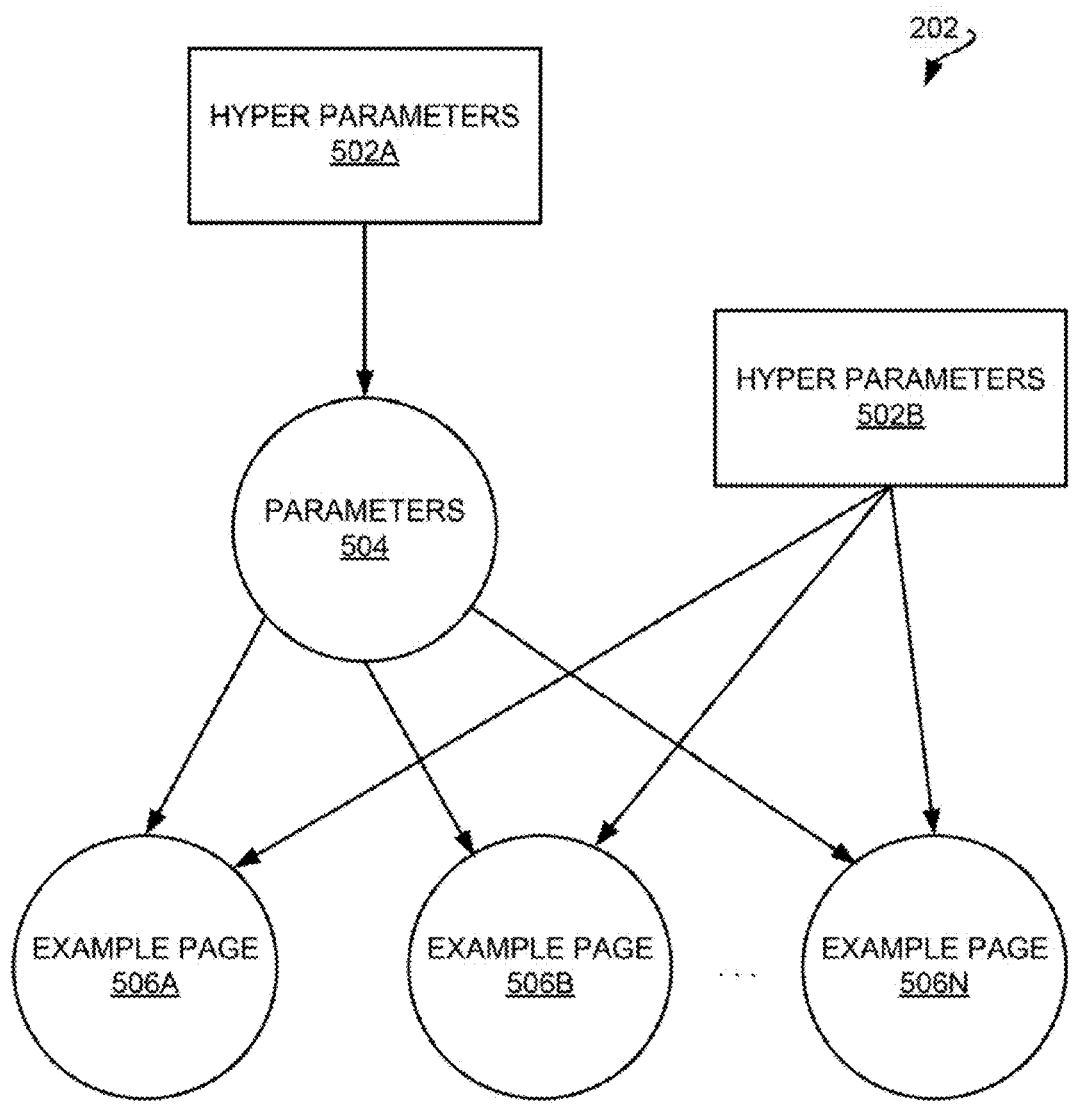
FIG. 5 is a diagram of a probabilistic mixed text-and-graphics layout model, according to an example of the disclosure.

The hyper parameters of the probabilistic model 202 for the layout template 300 in question are then optimized, without user interaction, based on these example pages that have been received from the user (404). FIG. 5 shows the probabilistic model 202, according to an example of the disclosure. The probabilistic model 202 for the layout template 300 includes hyper parameters 502A and 502B of the layout template 300. The probabilistic model 202 further includes parameters 504 of the layout template 300.

The parameters 504 are determined from the example pages 506A, 506B, . . . , 506N, collectively referred to as the example pages 506, that have been received from the user in part 402. The hyper parameters 502A are determined from the parameters 504. By comparison, the hyper parameters 502B are determined from the example pages 506.

The example pages 506 may be referred to mathematically as allocations $A_1, A_2, \ldots, A_n$, or $\{A_i\}$. The more example pages 506 there are, the better the probabilistic model 202. For each example page 506, the corresponding allocation $A_i$ describes the manner in which the user has laid out the page 506. For instance, this allocation can include values for the margins 304 the width 308, and the heights 306, 314, and 316.

The parameters 504 are expressed as a vector $\vec{\Theta}$. In determining the hyper parameters 502 of the probabilistic model 202, the vector $\vec{\Theta}$ may be considered a hidden variable that is integrated out in the process of determining the hyper parameters 502. The hyper parameters 502A include the mean $\overline{\Theta}$ of the distribution of the parameters vector $\vec{\Theta}$, as well as a precision matrix $\overline{\Lambda}$ which is an inverse of a matrix of covariances of the vector $\vec{\Theta}$. These two parameters define the aesthetics of a layout allocation on a page.

As such, the user does not have to specify the hyper parameters 502A. That is, the user does not have to specify the constraints on the parameters 504 (which are implied within the distribution $\overline{\Theta}$), nor the variances and covariances of the parameters 504. The hyper parameters 502B include the precisions $\{\alpha\}$ and $\{\beta\}$ of the parameters 504, where the precision $\alpha$ is equal to one over the variance with respect to the height of the page, and the precision $\beta$ is equal to one over the variance with respect to the width of the page. As such, $\alpha$ specifies how well a layout allocation fits the page height-wise, and that $\beta$ specifies how well the layout allocation fits the page width-wise.

The probabilistic model 202 depicted in FIG. 5 can be mathematically expressed as $$P(\{A_i\}, \vec{\Theta}, \vec{\psi}) \propto \prod_i P(A_i | \vec{\Theta}, \{\alpha\}, \{\beta\}) P(\vec{\Theta} | \overline{\Theta}, \overline{\Lambda}).$$

In this equation, P(•) represents a probabilistic distribution. The first probabilistic distribution specifies how well a layout allocation fits the page both height-wise and width-wise. The second probabilistic distribution specifies how aesthetically pleasing the layout allocation on the page is. That is, the second probabilistic distribution specifies how close the parameters of the layout allocation on the page are to $\overline{\Theta}$, where $\overline{\Lambda}$, is effectively a weighting function that indicates the extent to which it matters whether the parameters are close to $\overline{\Theta}$. The hyper parameters 504 are represented in the left hand of this equation as $\vec{\psi} = \{\{\alpha\}, \{\beta\}, \vec{\Theta}, \vec{\Lambda}\}$.

The hyper parameters 502 of the probabilistic model 202 can be optimized by employing an expectation-maximization (EM) approach to converge to a local maximum (406). The local maximum that is to be maximized can be expressed as $$\log\left(\int_{\vec{\Theta}} P(\{A_i\}, \vec{\Theta}, \vec{\psi}) d\vec{\Theta}\right).$$

Stated another way, the marginal log likelihood of the hyper parameters 502 is maximized. The marginal log likelihood can be expressed as $$\vec{\psi}_{ML} = \log\left(\int_{\vec{\Theta}} P(\{A_i\}, \vec{\Theta}, \vec{\psi}) d\vec{\Theta}\right).$$

It is noted, therefore, by maximizing the marginal log likelihood of the hyper parameters 502, the vector $\vec{\Theta}$ of the parameters is integrated out, and thus is a hidden variable.

The expectation-maximization approach is performed by performing iterations of an expectation determination and a maximization determination until convergence is reached (408). The expectation determination of iteration n is $$Q^{(n)}(\vec{\Theta}) = \frac{P(\{A_i\}, \vec{\Theta}, \vec{\psi}^{(n)})}{\int_{\vec{\Theta}} P(\{A_i\}, \vec{\Theta}, \vec{\psi}^{(n)}) d\vec{\Theta}}.$$

The maximization determination of iteration n+1 is $$\psi_{ML}^{(n+1)} = \underset{\vec{\psi}}{\operatorname{argmax}} \left\{ \begin{array}{l} \sum_i E_{Q^{(n)}(\vec{\Theta})}[\log\{P(A_i | \vec{\Theta}, \{\alpha\}, \{\beta\})\}] + \\ E_{Q^{(n)}(\vec{\Theta})}[\log\{P(\vec{\Theta} | \vec{\Theta}, \overline{\Lambda})\}] \end{array} \right\}.$$

In both these determinations, E is an expectation function.

For the first iteration, the hyper parameters 502 within the vector $\vec{\psi}$ can be initially set to predetermined seed values to determine Q via the expectation determination. The value of Q is then used to determine the value of the vector $\vec{\psi}$ (i.e., $\vec{\psi}_{ML}$) via the maximization determination. This value of the vector $\vec{\psi}$ is then used in the next iteration to again determine the value of Q, which is used in this next iteration to determine the value of the vector $\vec{\psi}$, and so on. The expectation and maximization determinations are thus iterated until the vector $\vec{\psi}$ converges to a local maximum.

Because the vector $\vec{\psi}$ converges to a local maximum, the hyper parameters 502 specified within the vector $\vec{\psi}$ may be locally optimally and not globally optimal. To obtain globally optimal hyper parameters 502, the EM approach may be repeated a number of times with different predetermined seed values for the vector $\vec{\psi}$. Each time the EM approach is performed in this manner, different hyper parameters 502 within the vector $\vec{\psi}$ may be obtained. The hyper parameters 502 within the vector $\vec{\psi}$ that are globally optimal (i.e., that converge to a global maximum) as to compared to the hyper parameters 502 within each other such vector $\vec{\psi}$ are then selected.

The process that has been described determines the hyper parameters 502 for the probabilistic mixed text-and-graphics layout model 202 for a particular mixed text-and-graphics layout template 300. Parts 402 and 404 can be repeated for the probabilistic model 202 for each of the page layout templates 204. As such, the resulting probabilistic model 202 includes hyper parameters 502 for each page layout template 204. The probabilistic model 202 that can have hyper parameters 502 determined for each page layout template 204 can be the probabilistic model that is described in the two PCT patent applications previously referenced.

The probabilistic mixed text-and-graphics layout model 202 can then be used in accordance with text and graphics received from a user, who may be different than the graphics designer that provided the example pages in part 402, to probabilistically generate a page incorporating these text and graphics based on one of the templates 204. For instance, text and graphics can be received from such a user (410), and the text and graphics laid out on a page by using the probabilistic model 202 for the mixed text-and-graphics layout template 300 (412). The page is then output (414). Employment of the probabilistic model 202 in this respect can be performed as is described in the two PCT patent applications previously referenced.

Figure 6:
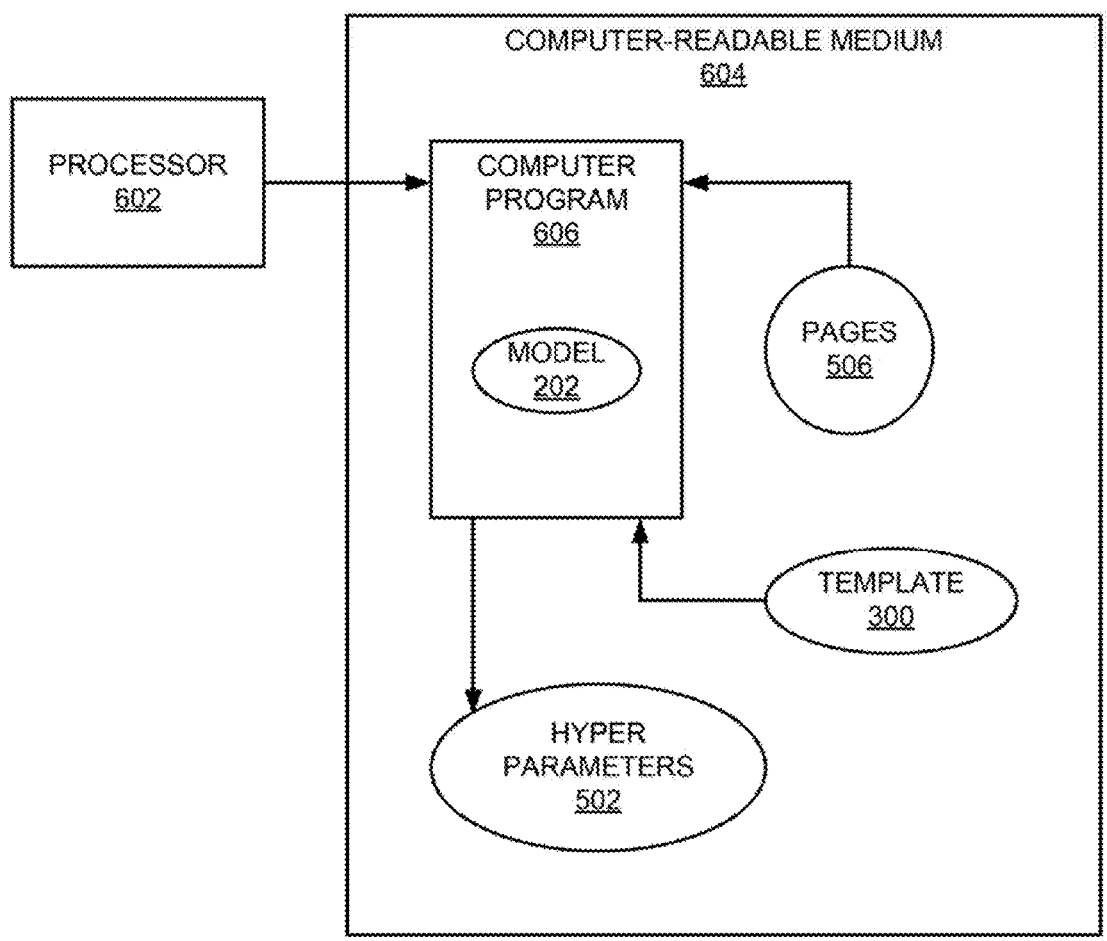
FIG. 6 is a diagram of a representative system, according to an example of the disclosure.

FIG. 6 in conclusion shows a representative system 600, according to an example of the disclosure. The system 600 may be implemented over one or more computing devices, such as desktop or laptop computers. The system 600 includes at least a processor 602 and a non-transitory computer-readable data storage medium 604. The computer-readable data storage medium 604 stores a computer program 606, as well as the layout template 300, the example pages 506, and the hyper parameters 502. The computer program 606 is said to implement the probabilistic mixed text-and-graphics layout model 202.

The computer program 606 generates the hyper parameters 502 of the probabilistic model 202 for the layout template 300, based on the example pages 506 that have been received from a user like a graphics designer. That is, execution of the computer program 606 by the processor 602 results in generation of the hyper parameters 502. In this respect, the computer program 606 can implement the method 400 that has been described.

I claim:

1. A method comprising:
   receiving from a first user, by a processor, a plurality of example pages in which text and graphics have been laid out using a mixed text-and-graphics layout template; and,
   optimizing, by the processor, a plurality of hyper parameters of a probabilistic model for the mixed text-and-graphics layout template, based on the example pages, by employing an expectation-maximization approach,
   wherein the probabilistic model is based on a first probabilistic distribution specifying an extent to which a layout allocation fits a page height-wise and width-wise and a second probabilistic distribution specifying an extent to which the layout allocation is aesthetically pleasing by determining the hyper parameters based on a mean of a distribution of parameter vectors determined from the example pages, and an inverse of a covariance matrix of the parameter vectors, parameters of the parameter vectors weighted according to an extent to which the parameters are closed to the parameter vectors;
   receiving text and graphics from a second user, by the processor;
   laying out the text and the graphics received from the second user on a page, by the processor using the probabilistic model for the mixed text-and-graphics layout template for which the hyper parameters have been optimized; and
   outputting the page.

2. The method of claim 1, wherein the parameters of the probabilistic model are considered hidden variables and are not directly solved for when optimizing the hyper parameters of the probabilistic model.

3. The method of claim 1, wherein the parameters of the probabilistic model comprise one or more of:
   a first parameter to scale a height and width of an image field of the mixed text-and-graphics layout template;
   a second parameter to scale an amount of white space between the image field and a text field of the mixed text-and-graphics layout template; and,
   third, fourth, five, and sixth parameters specifying a left margin, a right margin, a top margin, and a bottom margin, respectively, of the mixed text-and-graphics layout template.

4. The method of claim 1, wherein the probabilistic model for the mixed text-and-graphics layout template is:

$$P(\{A_i\}, \vec{\Theta}, \vec{\psi}) \propto \prod_i P(A_i | \vec{\Theta}, \{\alpha\}, \{\beta\}) P(\vec{\Theta} | \overline{\Theta}, \overline{\Lambda}),$$

where P (g) represents a probabilistic distribution; $\{A_i\}$ represents the example pages received from the user; $\vec{\Theta}$ represents a plurality of the parameters of the probabilistic model; $\vec{\psi} = \{\{\alpha\}, \{\beta\}, \overline{\Theta}, \overline{\Lambda}\}$; and, $\{\alpha\}, \{\beta\}, \overline{\Theta}$, and $\overline{\Lambda}$ represent the hyper parameters of the probabilistic model.

5. The method of claim 4, wherein $\{\alpha\}$ is equal to one over a variance with respect to page height; $\{\beta\}$ is equal to one over a variance with respect to page width; $\overline{\Theta}$ represents a mean of the distribution of the parameters of $\vec{\Theta}$; and $\overline{\Lambda}$ represents a precision matrix.

6. The method of claim 4, wherein optimizing the hyper parameters of the probabilistic model comprises maximizing a marginal log likelihood of the hyper parameters, where $$\vec{\psi}_{ML} = \log\left(\int_{\vec{\Theta}} P(\{A_i\}, \vec{\Theta}, \vec{\psi}) d\vec{\Theta}\right)$$

is the marginal log likelihood of the hyper parameters.

7. The method of claim 4, wherein optimizing the hyper parameters of the probabilistic model for the mixed text-and-graphics layout template comprises employing the expectation-maximization approach to converge to a local maximum that is to be maximized, expressed as $$\log\left(\int_{\vec{\Theta}} P(\{A_i\}, \vec{\Theta}, \vec{\psi}) d\vec{\Theta}\right).$$

8. The method of claim 7, wherein employing the expectation-maximization approach comprises performing a plurality of iterations of an expectation determination and a maximization determination, where the expectation determination of iteration n is $$Q^{(n)}(\vec{\Theta}) = \frac{P(\{A_i\}, \vec{\Theta}, \vec{\psi}^{(n)})}{\int_{\vec{\Theta}} P(\{A_i\}, \vec{\Theta}, \vec{\psi}^{(n)}) d\vec{\Theta}},$$

where the maximization determination of iteration n+1 is $$\psi_{ML}^{(n+1)} = \underset{\vec{\psi}}{\mathrm{argmax}} \left\{ \begin{array}{l} \sum_i E_{Q^{(n)}(\vec{\Theta})}[\log\{P(A_i | \vec{\Theta}, \{\alpha\}, \{\beta\})\}] + \\ E_{Q^{(n)}(\vec{\Theta})}[\log\{P(\vec{\Theta} | \overline{\Theta}, \overline{\Lambda})\}] \end{array} \right\},$$

where E is an expectation function.

9. The method of claim 1, wherein the probabilistic model is based on a product integration of the first probabilistic distribution and the second probabilistic distribution, over the example pages.

10. The method of claim 1, wherein the first probabilistic distribution is a probabilistic distribution of each example page conditioned on the parameters of the probabilistic model and a plurality of first hyper parameters of the probabilistic model.

11. The method of claim 10, wherein the second probabilistic distribution is a probabilistic distribution of the parameters of the probabilistic model conditioned on a plurality of second hyper parameters of the probabilistic model.

12. The method of claim 11, wherein optimizing the hyper parameters comprises integrating out the parameters from the probabilistic model, the parameters becoming a hidden variable of the probabilistic model.

13. The method of claim 12, wherein integrating out the parameters from the probabilistic model comprises maximizing a marginal log likelihood of the first hyper parameters and the second hyper parameters.

14. A non-transitory computer-readable data storage medium storing a computer program for execution by a processor to perform a method comprising:
receiving from a first user a plurality of example pages in which text and graphics have been laid out using a mixed text-and-graphics layout template; and,
optimizing a plurality of hyper parameters of a probabilistic model for the mixed text-and-graphics layout template, based on the example pages, by employing an expectation-maximization approach,
wherein the probabilistic model is based on a first probabilistic distribution specifying an extent to which a layout allocation fits a page height-wise and width-wise and a second probabilistic distribution specifying an extent to which the layout allocation is aesthetically pleasing by determining the hyper parameters based on a mean of a distribution of parameter vectors determined from the example pages, and an inverse of a covariance matrix of the parameter vectors, parameters of the parameter vectors weighted according to an extent to which the parameters are closed to the parameter vectors;
receiving text and graphics from a second user;
laying out the text and the graphics received from the second user on a page, by using the probabilistic model for the mixed text-and-graphics layout template for which the hyper parameters have been optimized; and outputting the page.

15. The non-transitory computer-readable data storage medium of claim 14, wherein the hyper parameters comprise a plurality of distributions of parameters of the probabilistic model,
and wherein the parameters of the probabilistic model are considered hidden variables and are not directly solved for when optimizing the hyper parameters of the probabilistic model.

16. A system comprising:
a processor;
a computer-readable data storage medium to store a plurality of example pages in which text and graphics have been laid out using a mixed text-and-graphics layout template; and,
a computer program stored on the computer-readable data storage medium and executable by the processor to:
optimize a plurality of hyper parameters of a probabilistic model for the mixed text-and-graphics layout template, based on the example pages, by employing an expectation-maximization approach,
wherein the probabilistic model is based on a first probabilistic distribution specifying an extent to which a layout allocation fits a page height-wise and width-wise and a second probabilistic distribution specifying an extent to which the layout allocation is aesthetically pleasing by determining the hyper parameters based on a mean of a distribution of parameter vectors determined from the example pages, and an inverse of a covariance matrix of the parameter vectors, parameters of the parameter vectors weighted according to an extent to which the parameters are closed to the parameter vectors;

receive text and graphics from a user;

lay out the text and the graphics received from the second user on a page, by using the probabilistic model for the mixed text-and-graphics layout template for which the hyper parameters have been optimized; and output the page.

17. The system of claim 15, wherein the hyper parameters comprise a plurality of distributions of the parameters of the probabilistic model, and wherein the parameters of the probabilistic model are considered hidden variables and are not directly solved for when optimizing the hyper parameters of the probabilistic model.

\* \* \* \* \*

UNITED STATES PATENT AND TRADEMARK OFFICE
CERTIFICATE OF CORRECTION

PATENT NO. : 9,218,323 B2  Page 1 of 1
APPLICATION NO. : 13/817689
DATED : December 22, 2015
INVENTOR(S) : Niranjan Damera-Venkata It is certified that error appears in the above-identified patent and that said Letters Patent is hereby corrected as shown below:

Claims

In column 9, line 9 approx., in Claim 4, delete "P(g)" and insert -- P(□) --, therefor.

Signed and Sealed this
Thirty-first Day of May, 2016

Michelle K. Lee
*Director of the United States Patent and Trademark Office*